Patented Dec. 2, 1924.

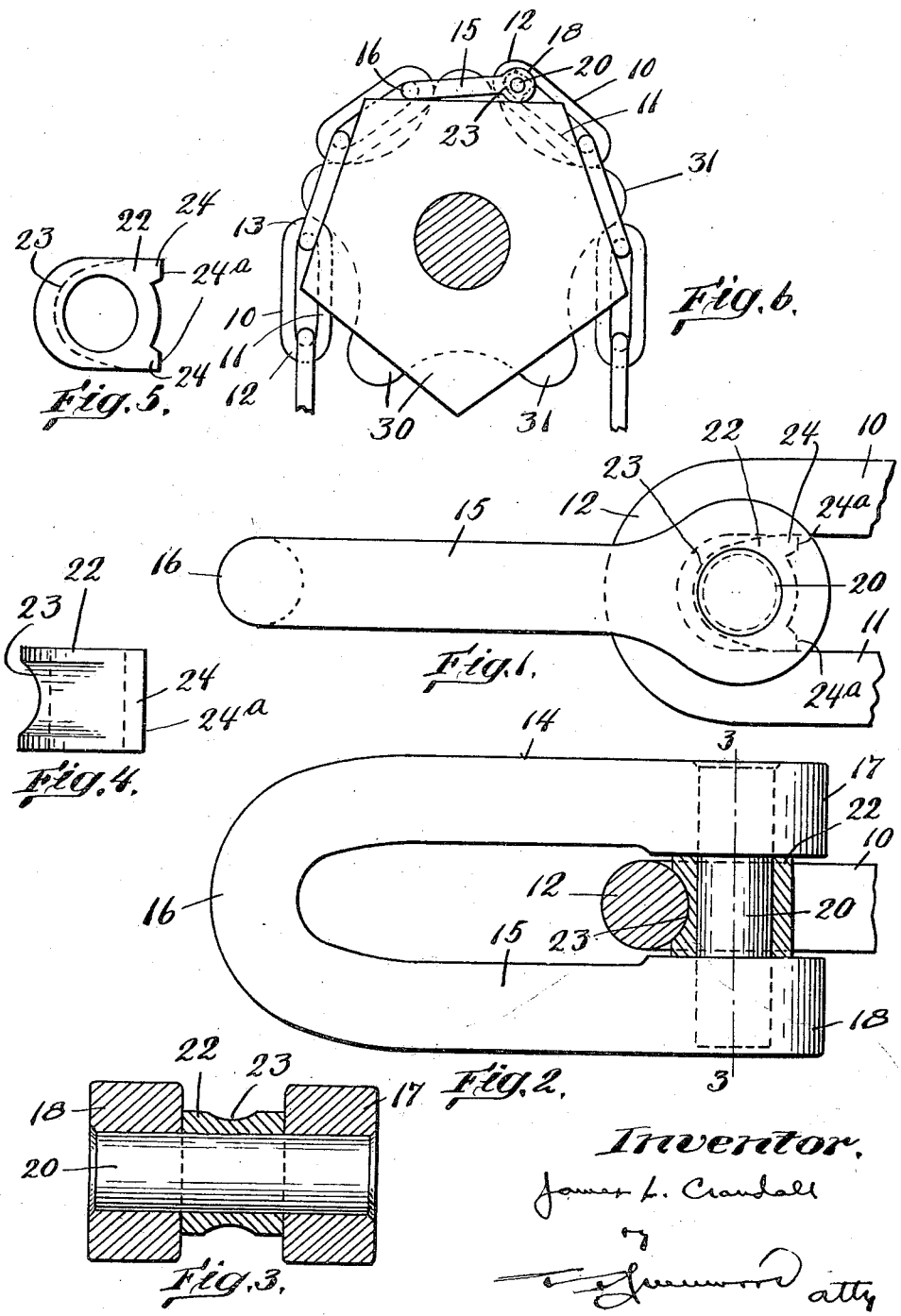

1,517,346

UNITED STATES PATENT OFFICE.

JAMES L. CRANDALL, OF MALDEN, MASSACHUSETTS.

CHAIN AND SHACKLE.

Application filed January 12, 1924. Serial No. 685,922.

*To all whom it may concern:*

Be it known that I, JAMES L. CRANDALL, a citizen of the United States, residing at Malden, in the county of Middlesex and State of Massachusetts, have invented an Improvement in Chains and Shackles, of which the following is a specification.

This invention relates to chains adapted to sustain relatively heavy loads, as, for instance, chains adapted to move a marine railway along its ways, and wherein the chain, with its ends connected together to form an endless loop, is passed over a driving sprocket, which sprocket is adapted to move the chain, and the load connected with it.

This invention has particular reference to a shackle adapted to connect the end links of a chain as above described to form an endless loop; or to connect together adjacent links or a chain; and the shackle is adapted to serve as one of the links of the chain.

The usual type of shackle comprises a U-shaped member formed with enlarged heads or eyes at its free ends, and a pin passed through the eyes, which pin is adapted to be engaged by the end-portion of a chain link, whereby to transmit the load on the chain between said shackle and link. The link and shackle are adapted for relative movement at the pin. The loop-end of the chain link is usually circular in cross-section, whereby it may be permitted universal movement with relation to its co-engaging link, or the shackle. By reason of the circular formation of the end of the link, it, ordinarily, has a bearing on the shackle pin in the middle only of the pin. The pin, therefore, is subject to bending stresses and must be made sufficiently large in diameter to resist such stresses successfully. A large pin requires a correspondingly large eye in the open end of the shackle. A large shackle-eye is not desirable for a reason that, as the shackle passes about the driving sprocket of the chain, the eye rests upon the sprocket and, being considerably larger that the body of the shackle, causes the shackle to be elevated, at one end, on the sprocket. This action causes the effective radius at which the driving effort is applied to the chain to be relatively largely increased, thereby largely increasing the power required to drive the chain and also creating other difficulties.

An object of this invention is a shackle adapted to engage a chain link and so constructed and arranged that the stress on the shackle pin is or may be distributed substantially uniformly over its unsupported extent whereby the pin may be subjected to shearing instead of bending stresses. The resistance of a pin to shear is usually much greater than its resistance to bending and, consequently, the shackle, as thus arranged, may have a pin of relatively small cross section, and eyes correspondingly small.

A further object of this invention is generally to improve the construction of shackles.

Fig. 1 is a side elevation of a shackle embodying the invention.

Fig. 2 is a plan view of the shackle of Fig. 1, partly in section.

Fig. 3 is a sectional view along line 3—3 of Fig. 2.

Fig. 4 is a plan view of the pin bushing.

Fig. 5 is a side elevation of the pin bushing.

Fig. 6 is a view of a driving sprocket for the chain and shackle illustrating more particularly the manner in which the shackle engages the sprocket.

As here shown the chain with which the shackle embodying the invention may be associated may comprise links having the more or less parallel and spaced side-portions 10 and 11 and the semi-circularly formed connecting and separating loop end-portions 12 and 13. The material comprising the link may have a substantially circular cross-section, especially in the end-portions whereby to permit the link to move freely in engagement with connected links or with the shackle.

The shackle embodying the invention is formed or provided with the two approximately parallel and spaced arms 14 and 15 and the connecting and separating end-portion 16. Preferably, the arms and end portion of the shackle are similar in shape and dimensions to the corresponding portions of the links of the chain. The free ends of the arms 14 and 15 are formed or provided with enlarged heads or eyes 17 and 18; and said eyes are arranged with their greatest dimension transversely to the plane of the body of the shackle. Said eyes are formed with aligned apertures therein through which a shackle pin 20 is extended, whereby to connect and separate said eyes, and said pin is or may be fixed in said eyes in any suitable manner. Ordinarily, said pin is engaged directly by the chain links and therefore the stress upon said pin, due to the circular cross-section of the end-portion of the link, is a bending stress. In accordance with this invention, means are provided to distribute the pressure caused by the chain link uniformly over substantially the entire unsupported section of the pin between the shackle-eyes, whereby to subject the pin to a shearing stress rather than a bending stress and thereby permit the pin, and the shackle-eyes, to be materially reduced in dimensions and yet support the load in a satisfactory manner. The means by which the above result is obtained may include a bushing 22. Said bushing is disposed upon said pin, to rotate thereon between the eyes of the shackle and extends along and has a bearing on said pin over substantially the entire unsupported extent thereof disposed within said shackle-eyes. Said bushing may be of any material suitable to withstand the pressure upon it without detrimental deformation; and transmit such pressure substantially uniformly over its bearing engagement with said pin. The maximum diameter of said bushing preferably does not exceed the spacing of the side members 10 and 11 of the chain link adapted to engage said bushing, whereby to permit the insertion of the bushing within the link. The bushing is formed with a peripheral groove 23 therein, which groove may extend over approximately one half of the circumferential extent of the bushing. The shape and arrangement of said groove is or may be such as to receive and provide a bearing support for the loop end-portion 12 of the chain link, as is more clearly indicated in Fig. 2, and thereby provide a seat for the end of the link. The bushing is or may be formed or provided with ears 24, having opposed flat faces 24ª, which ears are arranged to engage the side-portions 10 and 11 of the link and constrain the bearing and link to pivot, as a unit about the shackle pin, while permitting the link to slide over the flat faces 24ª of said ears for some degree of independent movement transversely of the bushing, if the arrangement of the groove 23 is such as to permit such movement.

As thus arranged, the load on the chain link may be distributed to the bushing through the relatively large area of contact therewith, and the load on the bushing may be transmitted substantially uniformly over the length of the pin between the eyes. The pin, consequently, may be subject to shear rather than bending and therefor a pin of relatively small cross-sectional area may sustain a relatively great load without failure; and the dimensions of the eyes of the shackle may also be relatively small.

The chain is or may be driven by a sprocket 30, (Fig. 6) which sprocket may be pentagonal in shape and have the teeth 31 which are adapted to be received within alternate links of the chain. A tooth may also be received within the shackle, and the shackle may rest upon one of the flat sides of the sprocket. The shackle embodying this invention may lie substantially flat on the sprocket, as shown, by reason of the small diameter of the eyes thereof, and thereby preventing any substantial increase in the working radius at which the load is applied; and thereby also preventing any appreciable momentary increase in the power required for driving the chain.

I claim:

1. The combination of a chain link having a loop end-portion of circular cross-section, and a shackle adapted for connection with said link, said shackle comprising two spaced arms having adjacent free ends disposed on opposite sides of said link, a pin passed through and fixed in the free ends of said arms, and extended through said link, a bushing of substantial thickness disposed to rotate on said pin and extended substantially co-extensive with the unsupported length of said pin between said shackle-arms, said bushing having a circularly-formed peripheral groove therein extended over approximately half the circumferential extent of the bushing in which the circular loop end-portion of the chain is received and in which groove said link may move transversely of said bushing, and said bushing, having opposed ears on the side of said bushing opposite said peripheral groove, said ears arranged to engage the opposite sides of the link, whereby to constrain said link and bushing for unitary pivotal movement about said pin, and said ears having opposed flat faces in engagement with the opposite sides of said link, whereby to provide for independent movement of said link in said groove transversely of said bushing.

2. The combination of a chain link having a loop end-portion and a shackle connected with said link, said shackle comprising two spaced arms having opposed free ends, a pin passed through and fixed in the free ends of said arms, and also passed through said link, and a bushing rotatably received on said pin and disposed substantially coextensive with that portion of said pin disposed between said arms, said bushing having a maximum diameter not greater than the opening in said link, and having a peripheral groove which is extended for approximately half the circumferential length of the bushing, and in which groove the loop end-portion of said chain is received, and said bushing having means engaging the opposite sides of said link and arranged to constrain said bushing and link for rotary movement about said pin.

In testimony whereof, I have signed my name to this specification.

JAMES L. CRANDALL.